United States Patent
Hemmati

(10) Patent No.: US 11,542,040 B1
(45) Date of Patent: Jan. 3, 2023

(54) LOW EARTH ORBIT SATELLITE COMMUNICATION SYSTEM EMPLOYING BEAM-HOPPING

(71) Applicant: Meta Platforms, Inc., Menlo Park, CA (US)

(72) Inventor: Hamid Hemmati, Los Angeles, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 644 days.

(21) Appl. No.: 16/676,372

(22) Filed: Nov. 6, 2019

Related U.S. Application Data

(60) Provisional application No. 62/756,161, filed on Nov. 6, 2018.

(51) Int. Cl.
| | | |
|---|---|---|
| *B64G 1/10* | (2006.01) | |
| *H04B 7/185* | (2006.01) | |
| *B64G 1/44* | (2006.01) | |
| *H01Q 1/28* | (2006.01) | |
| *H04B 7/195* | (2006.01) | |
| *H04W 84/06* | (2009.01) | |
| *H04W 88/16* | (2009.01) | |

(52) U.S. Cl.
CPC ........... *B64G 1/1007* (2013.01); *B64G 1/443* (2013.01); *H01Q 1/288* (2013.01); *H04B 7/18541* (2013.01); *H04B 7/18576* (2013.01); *H04B 7/195* (2013.01); *H04W 84/06* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 5,790,070 A | 8/1998 | Natarajan et al. | |
| 6,992,992 B1 | 1/2006 | Cooper et al. | |
| 8,160,530 B2* | 4/2012 | Corman | H01Q 15/242 343/756 |
| 8,218,476 B2* | 7/2012 | Miller | H04B 7/18541 370/321 |
| 2018/0006370 A1* | 1/2018 | Hreha | H04W 56/0015 |

* cited by examiner

*Primary Examiner* — Shripal K Khajuria
(74) *Attorney, Agent, or Firm* — Greenberg Traurig, LLP

(57) ABSTRACT

The disclosed method for a communication satellite may include (1) simultaneously generating a first transmission beam to a first ground station and a second transmission beam to each of a plurality of second ground stations in sequence according to a schedule, (2) simultaneously receiving a third transmission beam from the first ground station and a fourth transmission beam from each of the second ground stations in sequence according to the schedule, (3) forwarding first data received via the third transmission beam to each of the second ground stations via the second transmission beam, and (4) forwarding second data received via the fourth transmission beam from each of the second ground stations to the first ground station via the first transmission beam. Various other methods and systems are also disclosed.

20 Claims, 8 Drawing Sheets

LOW EARTH ORBIT SATELLITE COMMUNICATION SYSTEM EMPLOYING BEAM-HOPPING

CROSS REFERENCE TO RELATED APPLICATION

This application claims the benefit of U.S. Provisional Application No. 62/756,161, filed 6 Nov. 2018, the disclosure of which is incorporated, in its entirety, by this reference.

BRIEF DESCRIPTION OF DRAWINGS

The accompanying drawings illustrate a number of exemplary embodiments and are a part of the specification. Together with the following description, these drawings demonstrate and explain various principles of the instant disclosure.

Figure 1:
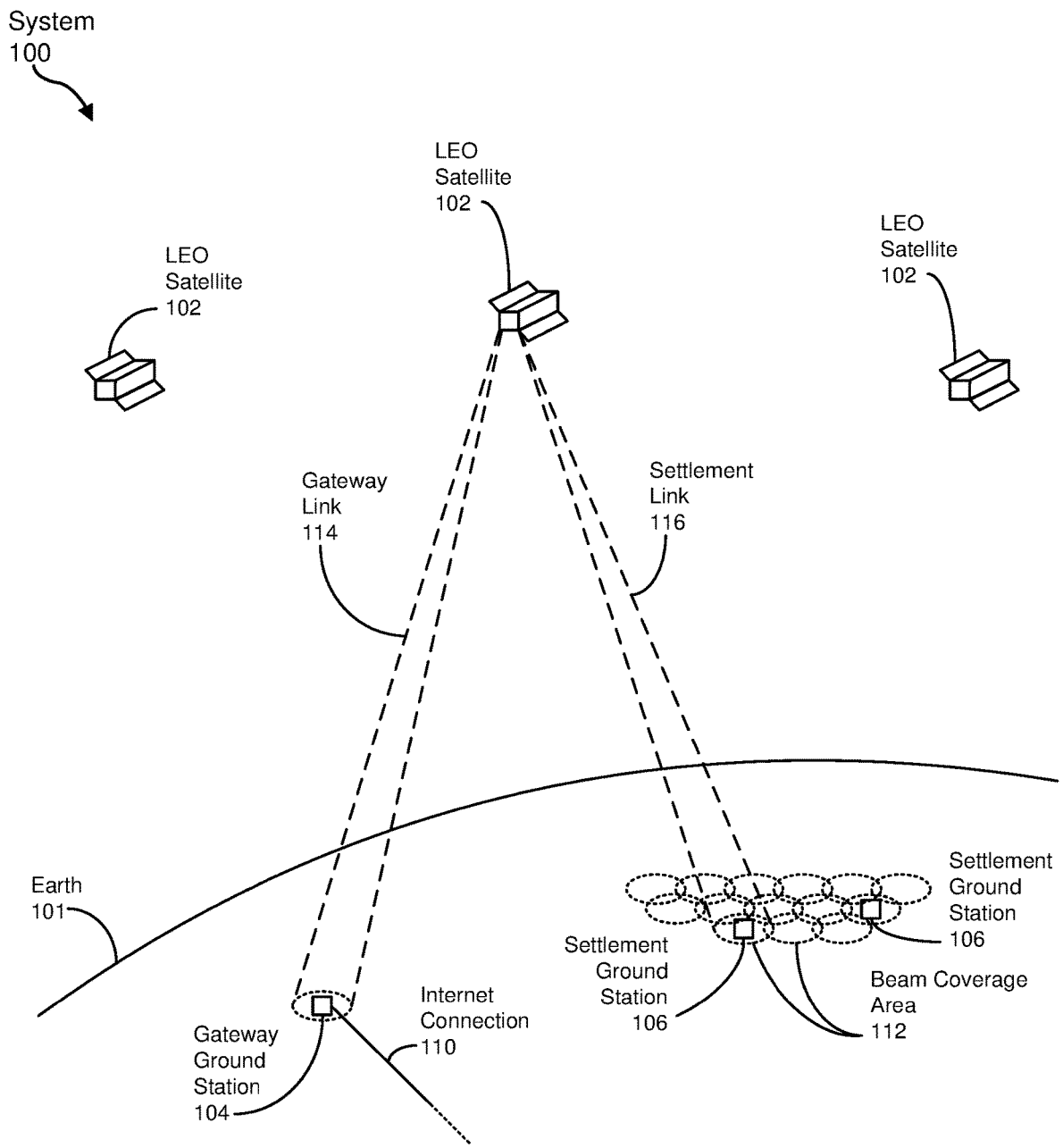
FIG. 1 is a conceptual diagram of an exemplary communication system providing Internet connectivity to a plurality of remotely located settlements via one or more gateway ground stations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within this disclosure.

DETAILED DESCRIPTION OF EXEMPLARY EMBODIMENTS

High-speed (e.g., broadband) Internet connectivity facilitates on-demand access to information, entertainment, communications, and the like for billions of people across many different countries. While many different types of communication system technology (e.g., wired, wireless radio-frequency (RF)/microwave/millimeter-wave or optical, land-based, or satellite-based) may be employed separately or in combination to provide such connectivity, use of such technologies is typically cost-prohibitive when those people yet to be serviced are located remotely from the nearest Internet access points. Consequently, provision of high-speed Internet connectivity to people in developing countries, rural locations, and other remote areas remains problematic.

More recently, satellite-based communications systems, such as low Earth orbit (LEO) satellite constellation systems, have been proposed to provide substantially global Internet connectivity. However, the capital expenditure and associated operating expense of the satellite portion of such systems, excluding any associated ground-based components, have been estimated to be at least several billion dollars. Such costs are likely to be a major barrier to providing such service to the low-income populations of rural areas in the developing world.

The present disclosure is generally directed to satellite-based communication systems, such as those that may provide Internet connectivity for underserved areas, that employ beam-hopping technology. However, various embodiments of such a system may be applied equally well to any or all areas of the world. As will be explained in greater detail below, embodiments of the instant disclosure may facilitate, by way of a plurality of satellites (e.g., LEO satellites) and associated ground stations, a communication system that may provide moderate data-rate performance at a significantly lower cost compared to other satellite-based communication constellations.

Features from any of the embodiments mentioned herein may be used in combination with one another in accordance with the general principles described herein. These and other embodiments, features, and advantages will be more fully understood upon reading the following detailed description in conjunction with the accompanying drawings.

Figure 2:
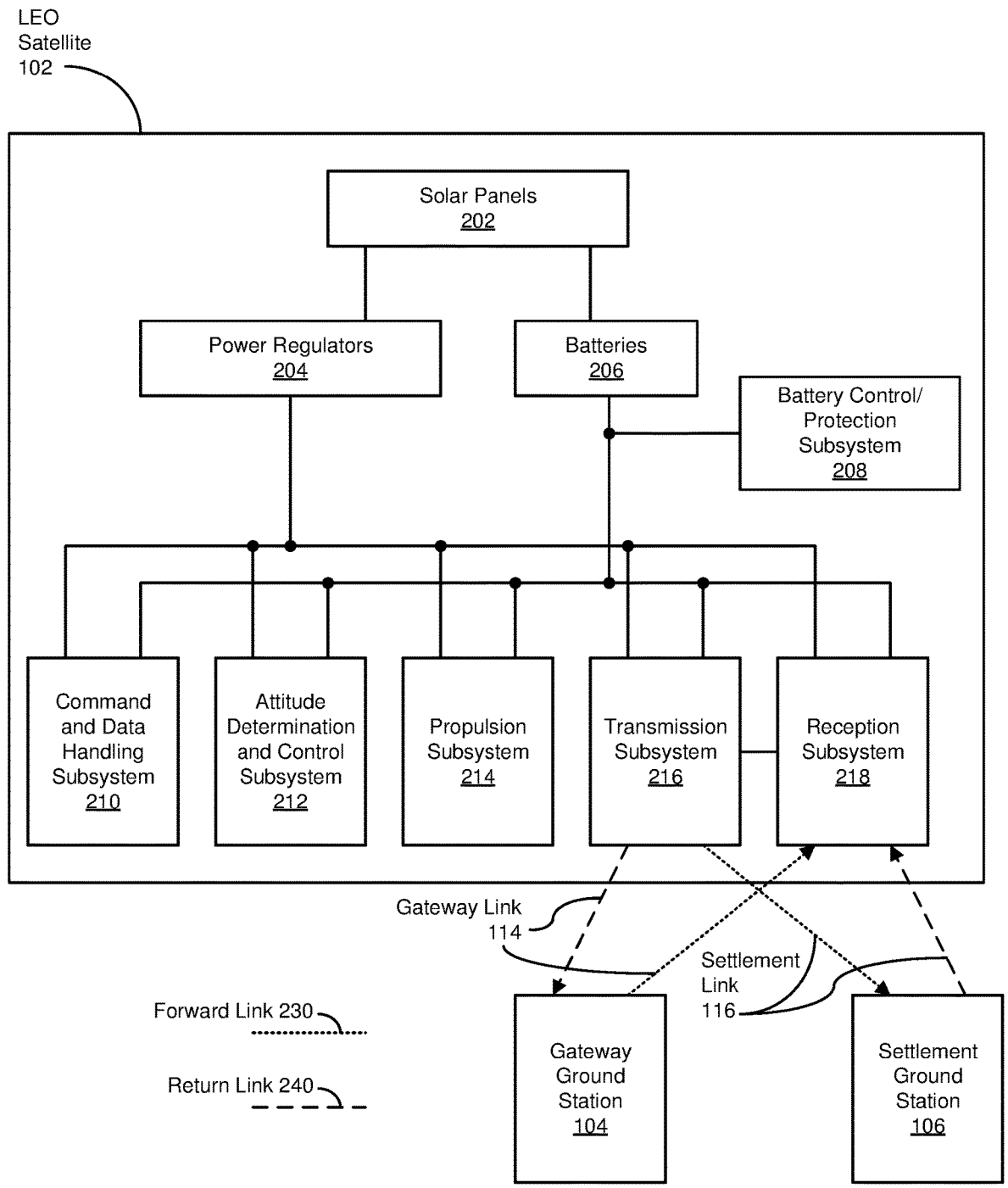
FIG. 2 is a block diagram of an exemplary LEO satellite employable in the communication system of FIG. 1.
Figure 3:
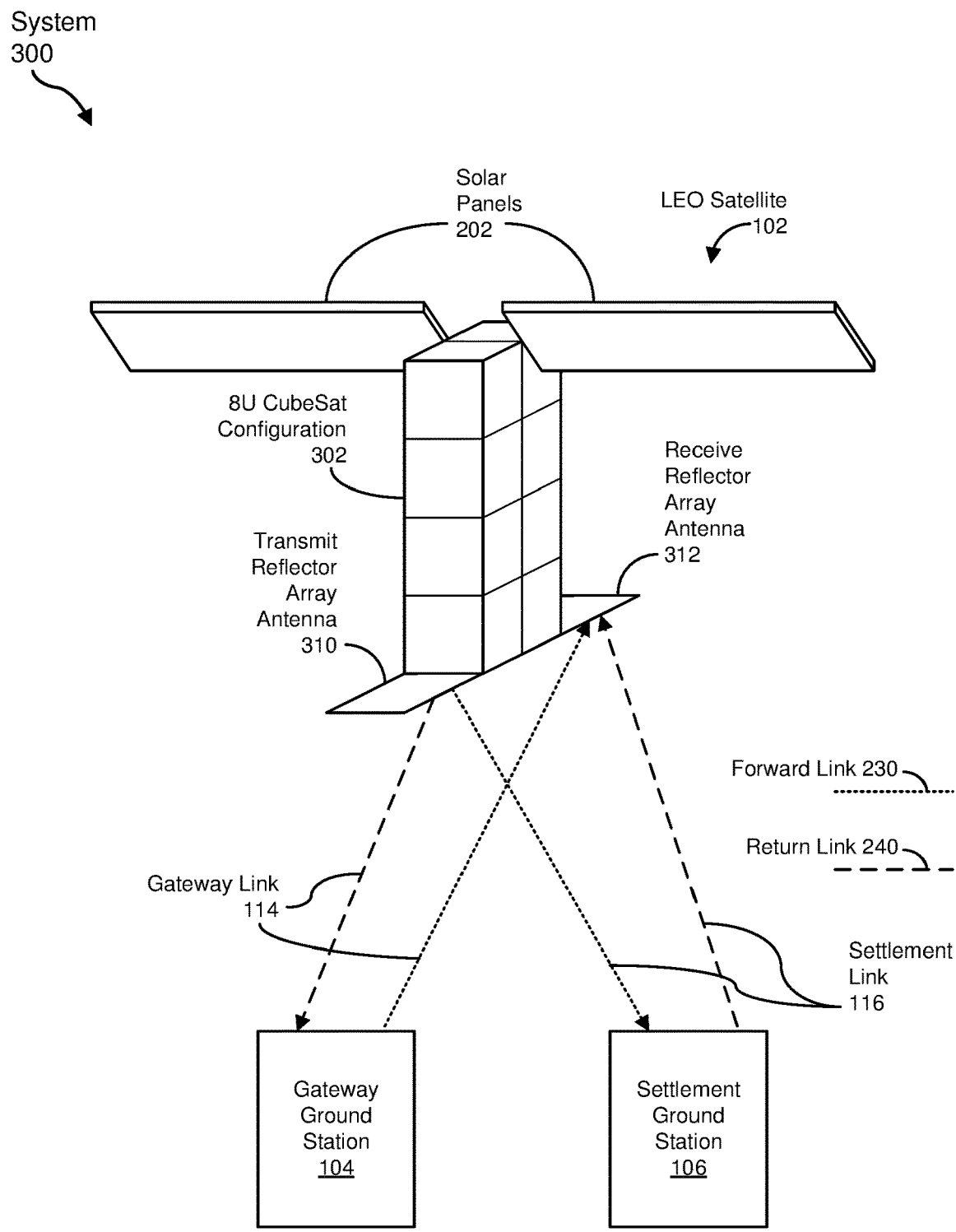
FIG. 3 is a conceptual diagram of another exemplary communication system employing a CubeSat-based LEO satellite.

The following will provide, with reference to FIGS. 1-8, detailed descriptions of satellite-based communication systems. An overall description of various embodiments of an exemplary communication system for providing Internet connectivity to remote settlement ground stations is presented in conjunction with FIG. 1. A more detailed discussion of exemplary satellites employable in the system of FIG. 1 that utilize beam-hopping among multiple settlement ground stations is discussed in connection with FIG. 2. A particular system employing a CubeSat-based LEO satellite is explained in reference to FIG. 3. Beam-hopping frame and associated super-frame examples are presented in conjunction with FIGS. 4 and 5, respectively. With respect to FIG. 6, a beam-hopping architecture that may be implemented within the system of FIG. 3 is explained. An exemplary method of servicing a new data request, such as within the system of FIG. 3, is discussed in connection with FIG. 7, and an exemplary method of handing off a settlement ground station between satellites, such as within the system of FIG. 3, is described in reference to FIG. 8.

In various embodiments discussed below, the satellites are described as low Earth orbit (LEO) satellites, which are often identified as satellites orbiting the Earth at an altitude of approximately 100 to 1200 miles above the surface of the Earth. However, satellites in other orbits (e.g., medium Earth orbit (MEO)) may also employ aspects of the various exemplary systems and methods described herein in other embodiments.

FIG. 1 is a conceptual diagram of an exemplary communication system 100 intended to provide Internet connectivity to a plurality of remotely located settlements (e.g., villages, towns, communities, etc.). As depicted in FIG. 1, system 100 may include a plurality of LEO satellites 102 orbiting the Earth 101, in addition to one or more gateway ground stations 104 and one or more settlement ground stations 106. While a single gateway ground station 104 and two settlement ground stations 106 are depicted in FIG. 1, many more of each ground station 104, 106 may be serviced by LEO satellites 102 in other embodiments. Additionally, in some examples, 100-200 LEO satellites 102 may be deployed in system 100 to cover a significant amount of the surface of the Earth, although other numbers of LEO satellites 102 may be used in other embodiments, depending on the particular areas of Earth to be serviced.

In some examples, gateway ground station 104 may be communicatively coupled (e.g., using one or more electronic, optical, or wireless communication connections) to an Internet connection 110 (e.g., to an Internet backbone via an edge router or other point of presence (POP)). Gateway ground station 104 may also communicate with one or more LEO satellites 102 (e.g., via gateway link 114), one at a time, by way of a radio frequency (RF) or millimeter (MM) wave antenna (e.g., a dish antenna approximately 0.5-1.5 meter (m) in diameter). While embodiments described herein focus on the use of RF or MM wave communication beams (e.g., depending on the desired link availability between gateway ground station 104 and LEO satellites 102 in view of varying environmental conditions and other factors), other systems employing optical beams for communication between LEO satellites 102 and gateway ground stations 104 or settlement ground stations 106 are also possible. In some embodiments, a single gateway ground station 104 may facilitate connection to the Internet for multiple (e.g., tens, hundreds, or thousands) of settlement ground stations 106.

In some examples, each settlement ground station 106 may be communicatively coupled to each of one or more user communication devices (e.g., desktop or laptop computers, tablets, smartphones, and so on) located near settlement ground station 106 (e.g., using a cellular phone connection, a Wi-Fi connection, an Ethernet connection, or the like). In some situations, settlement ground stations 106 may be located in a publicly available location, or centrally located position, within a settlement, such as a small, remotely located town or village. Each settlement ground station 106 may communicate with one or more LEO satellites 102 (e.g., via settlement link 116), one at a time, via an RF or MM wave antenna (e.g., a dish antenna approximately 0.5-1.5 m in diameter).

In some embodiments, a sufficient number of LEO satellites 102 may be employed to provide substantially continuous, or repeatedly available, communication coverage of one or more settlements. In some embodiments, LEO satellite 102 may provide a communication connection between settlement ground station 106 and gateway ground station 104 by way of settlement link 116 and gateway link 114, respectively. In some examples, LEO satellite 102, over some period of time (e.g., while LEO satellite 102 is passing overhead while within communication range of gateway ground station 104 and settlement ground stations 106 of a particular area), may substantially maintain connectivity with gateway ground station 104 and settlement ground stations 106 until a subsequent LEO satellite 102 (e.g., an LEO satellite 102 trailing the first LEO satellite 102) is positioned to provide such connectivity. Consequently, duties for providing connectivity between gateway ground station 104 and one or more corresponding settlement ground stations 106 may be passed or "handed off" from one LEO satellite 102 to the next over time.

In some examples, gateway link 114 and/or settlement link 116 may be bidirectional communication links facilitated by directed beams (e.g., RF or MM wave beams) between LEO satellite 102 and a ground station 104, 106. More specifically, in some embodiments, while gateway link 114 is maintained between LEO satellite 102 and gateway ground station 104, LEO satellite 102 may scan a single communication beam (e.g., an RF beam or MM wave beam) by way of beam-hopping or beam-steering technology over multiple settlement ground stations 106 located in a plurality of beam coverage areas 112 in series to establish settlement link 116 between LEO satellite 102 and each settlement ground station 106. In some embodiments, at an altitude for LEO satellite 102 of 500-550 kilometers (km), about 500 to over 1000 settlement ground stations 106 may be serviced by settlement link 116 in the span of a few seconds while LEO satellite 102 maintains gateway link 114 with a single gateway ground station 104. Also, in some examples, a diameter of each beam coverage area 112 may be in the range of tens of kilometers, although the various embodiments discussed herein are not so limited. The use of beam-hopping or beam-steering technology by LEO satellite 102 is described in greater detail in conjunction with FIG. 2.

FIG. 2 is a block diagram of an exemplary LEO satellite 102 employable in communication system 100 of FIG. 1. In this particular example, LEO satellite 102 may include one or more solar panels 202, one or more power regulators 204, batteries 206, a battery control/protection subsystem 208, a command and data handling subsystem 210, an attitude determination and control subsystem 212, and a propulsion subsystem 214, along with a transmission subsystem 216 and a reception subsystem 218 for establishing communications over gateway link 114 and settlement link 116. Other embodiments of system 100 may include greater or fewer numbers of such components. Further, while FIG. 2 indicates that each device includes particular subsystems or components, one or more of the devices may include other combinations of subsystems or components not specifically discussed herein while remaining within the scope of the embodiments presented.

Solar panels 202 may capture energy from received photons (e.g., from the Sun) to provide electrical power to operate various components of LEO satellite 102. As indicated in the example of FIG. 2, such power may be provided by way of one or more power regulators 204 to maintain stable voltages to components 210-218. Solar panels 202, in some examples, may also charge batteries 206 (e.g., to operate components 210-218 when electrical power directly from solar panels 202 is unavailable). Additionally, battery control/protection subsystem 208 may control the flow of electrical energy from solar panels 202 to power regulators 204 and/or batteries 206, as well as from batteries 206 to power regulators 204, such as to maintain power delivery to components 210-218, charge batteries 206 when possible, and may protect against power surges or other problems with batteries 206 and/or components 210-218.

In some embodiments, command and data handling subsystem 210 may control the operation of one or more other components (e.g., components 212-218). Such control, in some examples, may be based on preprogrammed control elements within command and data handling subsystem 210, data received via sensors or other components of LEO satellite 102 (e.g., attitude determination and control subsystem 212), and/or commands received from a ground control station (not shown in FIGS. 1 and 2) (e.g., via gateway ground station 104 and gateway link 114, or by way of another wireless link). In some examples, command and data handling subsystem 210 may also react to fault or warning indications from other components 212-218. In some embodiments, command and data handling subsystem 210 may include a microprocessor, microcontroller, or other physical processor that executes software or firmware stored within a memory device or computer-readable memory. Also, in some examples, command and data handling subsystem 210 may include logic which may reset one or more other components 212-218 based on data (e.g., alerts, warnings, or errors) received from those components 212-218.

Attitude determination and control subsystem 212, in some embodiments, may include one or more sensors (e.g., Global Positioning System (GPS) sensors, star trackers, inertial measurement units (IMUs), and so on) to determine a current orientation of the LEO satellite 102, possibly in relation to some reference orientation or desired orientation. Further, in some examples, attitude determination and control subsystem 212 may include one or more actuators (e.g., torquers, reaction wheel assemblies (RWAs), control moment gyroscopes (CMGs), and so forth) to alter the current orientation of LEO satellite 102 to a desired orientation (e.g., an orientation that may facilitate the transmission and reception of data over gateway link 114 and settlement link 116). In some examples, attitude determination and control subsystem 212 may also employ propulsion subsystem 214 in altering the current orientation of LEO satellite 102.

In some embodiments, propulsion subsystem 214 may employ thrusters and/or other propulsion components to alter the orientation, velocity, and/or flight path of LEO satellite 102. For example, propulsion subsystem 214 may receive commands from attitude determination and control subsystem 212 to alter a current orientation of LEO satellite 102, as described above. Also, in some embodiments, propulsion subsystem 214 may receive commands from command and data handling subsystem 210 to re-task (e.g., change the flight path of) LEO satellite 102 within the spatial configuration of other LEO satellites 102 of system 100, such as in response to a change in system configuration, in response to a failure of another LEO satellite 102, or in response to other events.

In some examples, transmission subsystem 216 may generate the communication beams for transmitting data from LEO satellite 102 to both gateway ground station 104 (e.g., via gateway link 114) and settlement ground station 106 (e.g., via settlement link 116). Also, in at least some embodiments, reception subsystem 218 may receive communication beams carrying data to LEO satellite 102 from both gateway ground station 104 (e.g., via gateway link 114) and settlement ground station 106 (e.g., via settlement link 116). In some examples, transmission subsystem 216 and reception subsystem 218 may be implemented using two transceiver units (e.g., RF transceiver units), one each for gateway link 114 and settlement link 116. In some examples, transmission subsystem 216 and reception subsystem 218 may represent a "bent-pipe" configuration, in which data received via gateway link 114 is transmitted directly via settlement link 116, and data received over settlement link 116 is transmitted directly over gateway link 114. In addition, gateway link 114 and settlement link 116 may be employed in combination to facilitate a forward link 230 (e.g., a communication link from gateway ground station 104 to settlement ground station 106) and a return link 240 (e.g., a communication link from settlement ground station 106 to gateway ground station 104). In some embodiments, communication system 100 may be structured to provide more bandwidth over forward link 230 than return link 240.

In some examples in which gateway link 114 and settlement link 116 are RF or MM wave communication links (e.g., depending on the desired link availability of gateway link 114 and/or settlement link 116), the transceiver units, as well as their corresponding transceivers in gateway ground station 104 and settlement ground station 106, may operate in the Q/V band, the lightly licensed E band (at about 70-80 GHz, with approximately 10 GHz of available spectrum), the W band, or the Ku and/or Ka band (at about 26.5-40 GHz, with about 2 GHz of available spectrum at any particular frequency). In some examples, each direction (e.g., uplink or downlink) of gateway link 114 and settlement link 116 may provide a data rate of approximately 1.5 gigabits per second (Gbps).

To facilitate RF-based gateway link 114 and settlement link 116, each transceiver may be coupled with a corresponding antenna. In some examples, to provide the beam-hopping or beam-steering functionality associated with settlement link 116, one or both antennae may be an electronically steered antenna, such as those employing a flat panel phased array (e.g., a reflector array antenna), a Butler matrix, a Luneburg lens, a Rotman lens, or the like.

In some embodiments, to facilitate modular design and reduced development and deployment costs, LEO satellite 102 may be configured according to CubeSat miniaturization standards. In some examples, CubeSats and other small satellites may be more generically referred to as "microsatellites". More particularly, in some examples, LEO satellite 102 may be configured as a 6U or 8U satellite, with each "U" (unit) being sized as a cube ten centimeters (cm) on a side. In some examples, one unit may include a transceiver dedicated for gateway link 114 and a second may include a separate transceiver for settlement link 116, with other units being dedicated for other various components of LEO satellite 102 (e.g., power regulators 204, batteries 206, and subsystems 208-214). Consequently, in some embodiments, LEO satellite 102 may weigh less than 15 kilograms (kg) and may consume peak direct-current (DC) power of 120-150 watts (W). Further, in some embodiments, such a satellite configuration may include one or more electronically steered flat panel antennas (e.g., approximately 10 cm by 20 cm in size). Moreover, in some examples, these flat panel antennas may be folded to the sides of LEO satellite 102 during launch, and subsequently extended and deployed to facilitate communications with gateway ground station 104 (via gateway link 114) and settlement ground station 106 (via settlement link 116).

In some examples, LEO satellite 102 may employ two antennas (e.g., two flat panel antennas) to facilitate gateway link 114 and settlement link 116. In one embodiment, a first antenna may be employed to transmit data to, and receive data from, gateway ground station 104, while a second antenna may be used to transmit data to, and receive data from, settlement ground station 106. In another embodiment, a first antenna may be employed to only transmit data to both gateway ground station 104 and settlement ground station 106, while a second antenna may be used to only receive data from both gateway ground station 104 and settlement ground station 106.

FIG. 3 is a conceptual diagram of a communication system 300 employing an 8U CubeSat configuration 302 for LEO satellite 102. However, other CubeSat configurations (e.g., a 6U CubeSat configuration) may be employed in other examples. In addition to solar panels 202 shown extending from opposite long sides of a top end of LEO satellite 102, separate reflector array antennas (e.g., a transmit reflector array antenna 310 and a receive reflector array antenna 312) are shown extending from opposing short sides of a bottom end of LEO satellite 102. In some embodiments, transmit reflector array antenna 310 and receive reflector array antenna 312, along with their associated feed structures (not illustrated in FIG. 3) may be initially folded alongside LEO satellite 102 during launch, prior to unfolding during deployment of LEO satellite 102.

In some examples, each of transmit reflector array antenna 310 and receive reflector array antenna 312 may be dimensioned approximately 10 cm by 20 cm and be capable of providing or receiving dual steerable beams: one directed to or from gateway ground station 104 and another to or from settlement ground station 106. Each of transmit reflector array antenna 310 and receive reflector array antenna 312 may also employ or receive circularly-polarized beams operating at different frequencies to prevent conflicts between beams. In one example employing the Ka band, transmit reflector array antenna 310 may transmit a left-hand circularly polarized (LHCP) beam at a first frequency range (e.g., 17.8-18.2 gigahertz (GHz)) to gateway ground station 104 and transmit a right-hand circularly polarized (RHCP) beam at a second frequency range (e.g., 18.8-20.2 GHz) to settlement ground station 106 simultaneously, while receive reflector array antenna 312 may receive a RHCP beam at a third frequency range (e.g., 28.6-30.0 gigahertz (GHz)) from gateway ground station 104 and receive an LHCP beam at a fourth frequency range (e.g., 27.5-27.8 GHz) from settlement ground station 106 simultaneously. Using these beams, LEO satellite 102 may provide a bent-pipe transmission path for each of forward link 230 and return link 240.

In some embodiments, in the forward link 230, gateway ground station 104 may transmit all data to LEO satellite 102 for delivery to multiple settlement ground stations 106 in a multiplexed manner (e.g., using time-division multiple access (TDMA)). While LEO satellite 102, upon receiving this data, may then use a single transmit beam to deliver the data to its intended one or more settlement ground stations 106 by steering or hopping the transmit beam to different settlement ground stations 106, or groups thereof, one at a time, in the order in which the data are received at LEO satellite 102. Further, in some examples, data from multiple settlement ground stations 106 may be received via a single beam that hops among settlement ground stations 106, and then delivered as a TDMA stream of data to gateway ground station 104 via return link 240.

Figure 4:
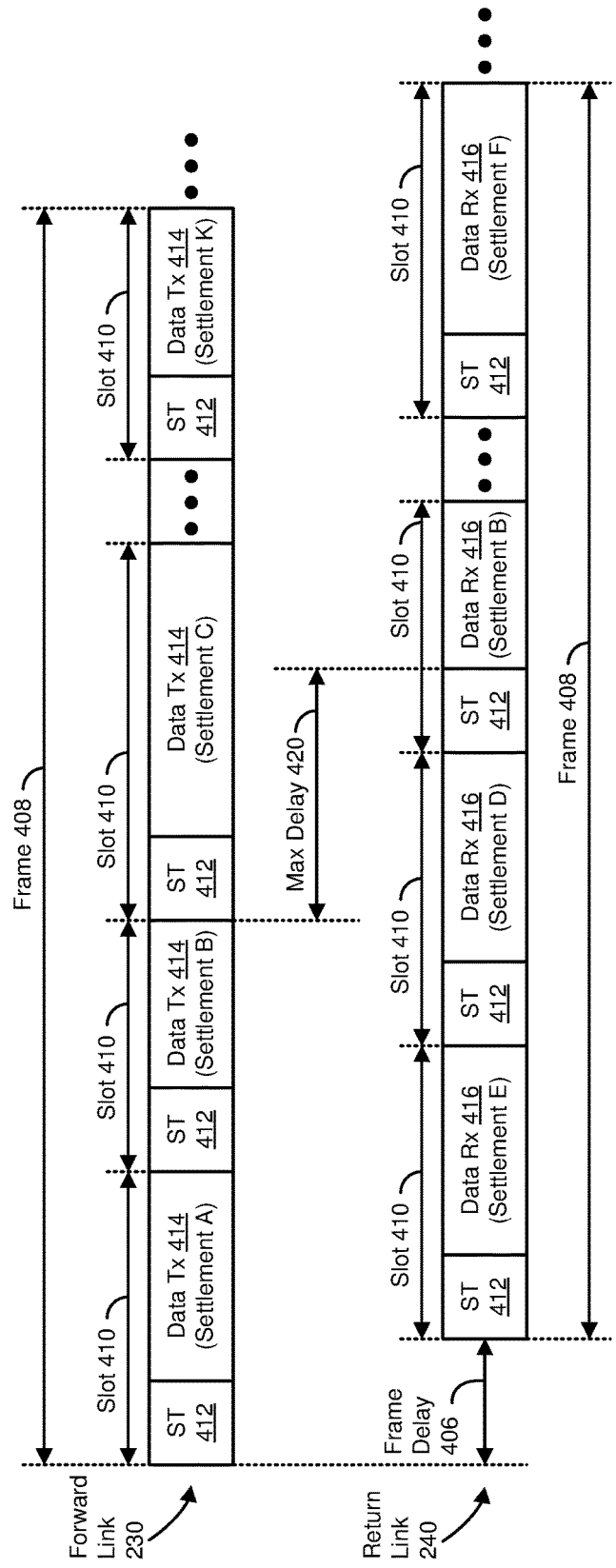
FIG. 4 is a timing diagram of exemplary beam-hopping frames employed for communication between a gateway ground station and multiple settlement grounds stations via an LEO satellite.

More specifically, FIG. 4 is a timing diagram of a particular beam-hopping example 400 showing the portion of forward link 230 and return link 240 between gateway ground station 104. As illustrated, the data in both forward link 230 and return link 240 may be organized in successive frames 408 (e.g., of substantially equal time length), with each frame 408 being further divided into a number of slots 410. Further, each slot 410 may begin with a settle time (ST) 412 to facilitate redirection or hopping of a transmit or receive beam from a settlement ground station 106 to another. Settle time 412 may be followed by a data transmission 414 (for forward link 230) or a data reception 416 (e.g. for return link 240). As shown in FIG. 4, while the length of each settle time 412 may be approximately the same, the length of each data transmission 414 or data reception 416 within a slot 410, as well as from slot 410 to slot 410, may be different (e.g., based on an expected or experienced amount of data traffic or bandwidth associated with each settlement ground station 106). Moreover, in some embodiments, as depicted in FIG. 4, the order by which each successive slot 410 is directed to a corresponding settlement ground station 106 may be different between a frame 408 of forward link 230 and a corresponding frame 408 of return link 240. In yet other examples, the same order of settlement ground stations 106 may be employed in each frame 408 of forward link 230 and corresponding frame 408 of return link 240. Further, each slot 410 of each frame 408 may represent the same length of time to ease scheduling of data transmission and reception in some examples.

As mentioned above, on the transmit and receive beams between LEO satellite 102 and settlement ground stations 106, settle times 412 are employed to redirect the beams to the settlement ground station 106 associated with each slot 410. Consequently, the data transmission and reception timing on forward link 230 and return link 240 may be the same over both gateway link 114 and settlement link 116, thus allowing LEO satellite 102 to operate substantially as a repeater, or "bent pipe". In some examples, each frame 408 of return link 240 may be delayed by a frame delay 406 relative to corresponding frame 408 of forward link 230 to facilitate acknowledgment data to be returned on return link 240 in response to data transmitted over forward link 230. Frame delay 406, in some embodiments, may be several milliseconds (e.g., 20-100 ms) in length. In some examples, slots 410 of return link 240 may be ordered and timed to enforce a maximum delay 420 between data transmission 414 of a settlement ground station 106 and a corresponding data reception 416 of the same settlement ground station 106. One or both of frame delay 406 or maximum delay 420 may be implemented to improve a user's overall quality of experience when accessing the Internet. Similarly, the length of each frame 408 may be a particular length of time, such as a number of milliseconds (e.g., 300 ms), to ensure that every active settlement ground station 106 is revisited once per frame 408 to facilitate an enhanced quality of experience (e.g., similar to that provided by Long Term Evolution (LTE) communication systems).

Figure 5:
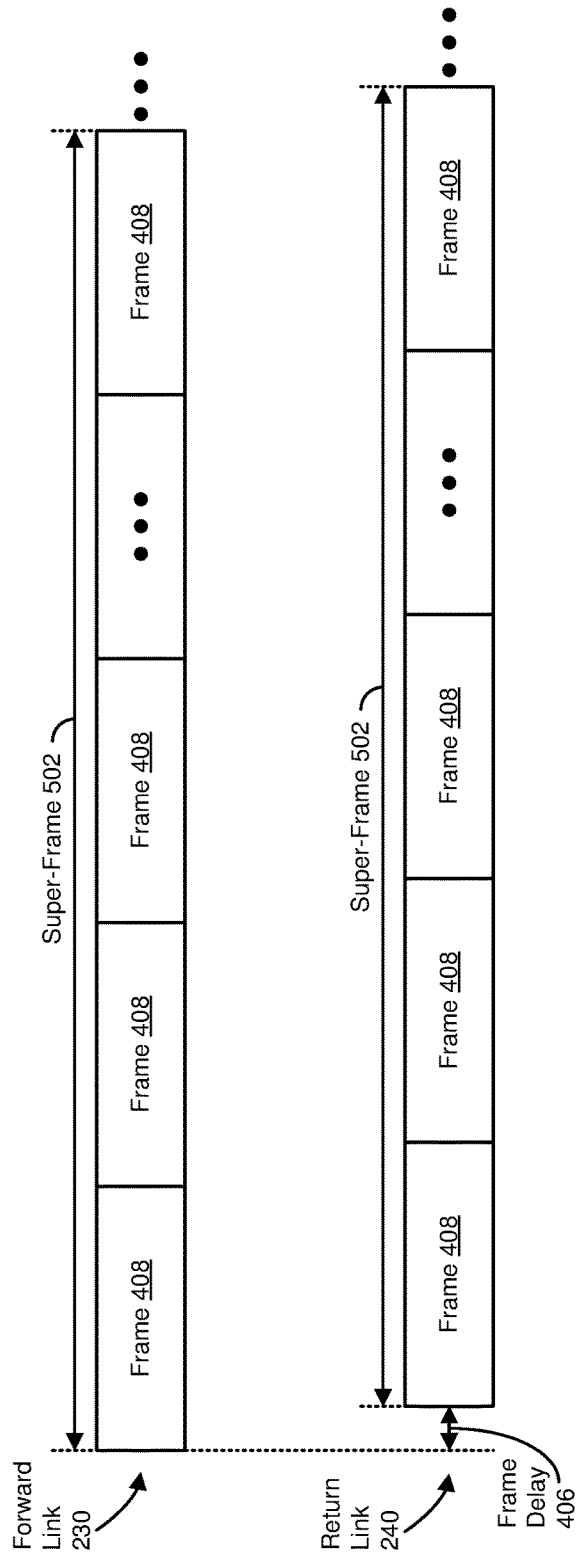
FIG. 5 is a timing diagram of exemplary beam-hopping super-frames including the frames of FIG. 4.

FIG. 5 is a timing diagram of an example of beam-hopping super-frames 502 employed for both forward link 230 and return link 240. More specifically, each super-frame 502 may include a particular number (e.g., the same number) of frames 408 (e.g., 10 frames). For example, 10 frames of 300 ms each may result in each super-frame 502 being approximately three seconds long. Other number of frames 408 per super-frame 502, as well as other lengths of time for each frame 408, may be used in other examples. In some embodiments, an inactive settlement ground station 106 (e.g., one not currently sending or receiving data, and thus not scheduled in a slot 410 of each frame 408) may become active by transmitting a request via return link 240 (e.g., during a round-robin poll of each possible or registered settlement ground station 106) once per super-frame 502. Thereafter, the requesting settlement ground station 106 may be implemented in the next super-frame 502 periodically via a slot 410 of each frame 408. Conversely, a settlement ground station 106 may be placed on inactive status (e.g., after a super-frame 502 due to lack of communication activity over forward link 230 and return link 240).

Figure 6:
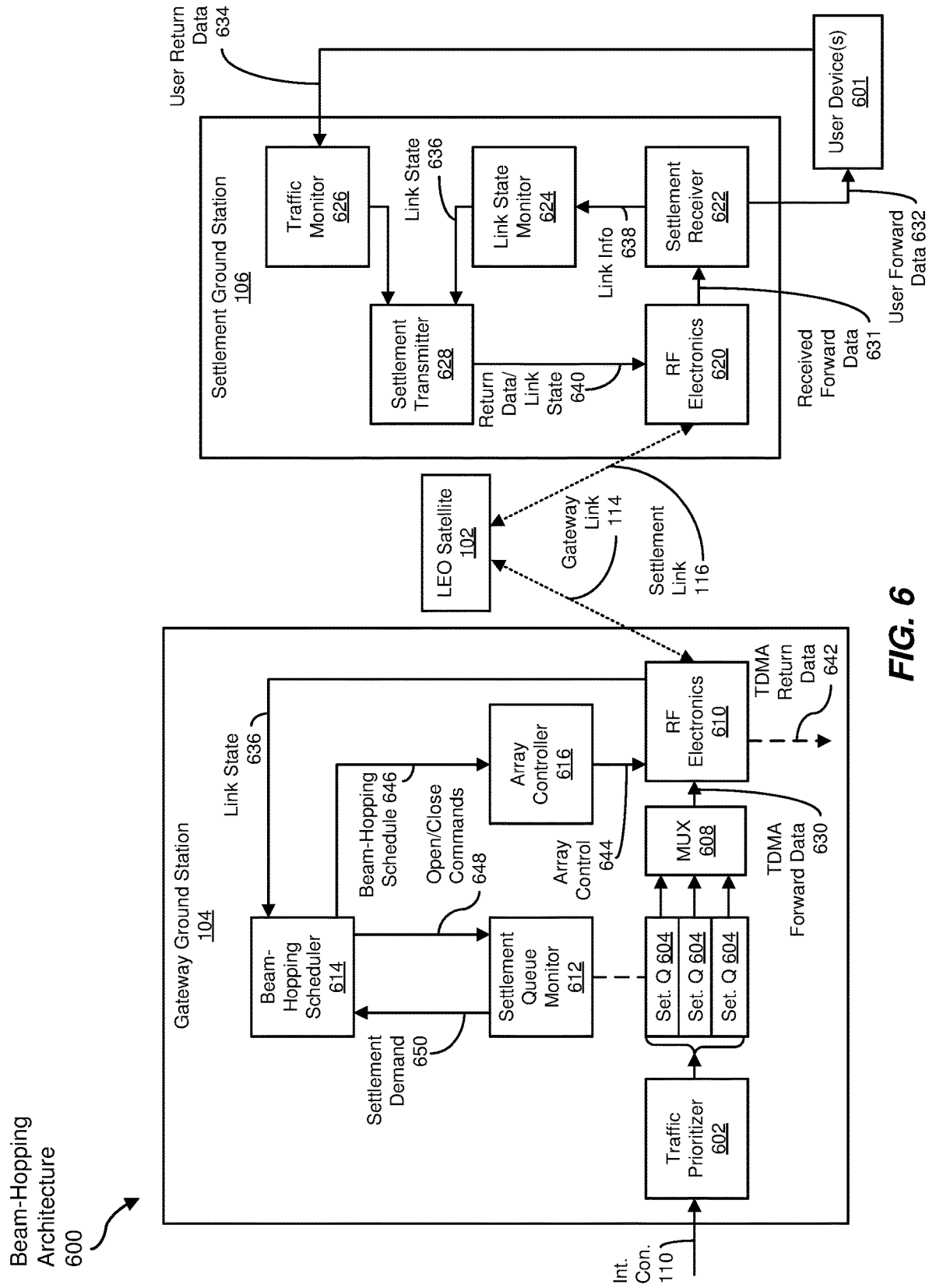
FIG. 6 is a block diagram of an exemplary beam-hopping architecture employable in the communication system of FIG. 3.

FIG. 6 is a block diagram of an exemplary beam-hopping architecture 600 describing various functional blocks of a gateway ground station 104 and a settlement ground station 106 communicating with gateway ground station 104 via gateway link 114 and settlement link 116, as facilitated by LEO satellite 102. As discussed above, gateway ground station 104 may be communicating with multiple settlement ground stations 106 concurrently, but only one settlement ground station 106 is depicted to simplify the following discussion. Also, beam-hopping architecture 600 focuses primarily on the use of forward link 230. Accordingly, additional circuitry may be employed in gateway ground station 104 and/or settlement ground station 106 to fully implement return link 240. Moreover, each functional block of gateway ground station 104 and settlement ground station 106 described below may be implemented in electronic hardware and/or software modules that include instructions that are stored in one or more memory devices and executable on one or more physical processors (not shown in FIG. 6).

As shown in FIG. 6, gateway ground station 104 may receive data traffic intended for multiple settlement ground stations 106 from Internet connection 110, which may be received according to logic employed in traffic prioritizer 602 (e.g., based on the type of data, the quality of service desired, and so on), which may then stage the received data into a set of settlement queues 604 (e.g., one settlement queue 604 per active settlement ground station 106). As described later, settlement queues 604 may be monitored and controlled via a settlement queue monitor 612. Data from settlement queues 604 may then be multiplexed into a single TDMA forward data stream 630 that may be fed to RF electronics 610 for transmission over gateway link 114, LEO satellite, and settlement link 116 (e.g., via forward link 230 according to the beam-hopping scheme described above with respect to FIGS. 4 and 5). Further, in some embodiments, RF electronics 610 may also forward array control information 644 to control transmit reflector array antenna 310 and receive reflector array antenna 312 (e.g., to direct the transmit and receive beams of each) according to a beam-hopping (or backhaul) schedule 646 generated by a beam-hopping scheduler 614. As shown in FIG. 6, RF electronics 610 may provide TDMA return data 642 received from multiple settlement ground stations 106 via return link 240, which may include data destined for Internet connection 110, data acknowledgments of data received at settlement ground stations 106 via forward link 230, and so on. In some examples, beam-hopping schedule 646 may determine one or more aspects of frames 408 and slots 410 of forward link 230 and return link 240 (e.g., the order of settlement ground stations 106 in each frame 408, the length of each slot 410, and so on). In some embodiments, beam-hopping scheduler 614 may base beam-hopping schedule 646 on settlement demand 650 (e.g., how much data is being transferred for each settlement ground station 106), as determined by settlement queue monitor 612. Additionally, beam-hopping scheduler 614 may control the amount and timing of data provided by each settlement queue 604 by way of open/close commands 648 that align with beam-hopping schedule 646.

In some embodiments, beam-hopping scheduler 314 may also base beam-hopping schedule 646 and/or open/close commands 648 in part on a link state 636 received from one or more settlement ground stations 106 via return link 240 and RF electronics 610. To generate link state 636, settlement ground station 106 may first receive, at RF electronics 620, data sourced from Internet connection 110 intended for settlement ground station 106 via forward link 230 over gateway link 114 and settlement link 116 via beam-hopping, as described above. After processing (e.g., amplification, block conversion, etc.) at RF electronics 620, received forward data 631 may be provided to settlement receiver 622, which may perform demodulation and/or decoding (e.g., using the DVB-S2(X) modulation and coding scheme) of received data and transmit resulting user forward data 632 to one or more user devices 601 (e.g., via 5G or other wireless or wired means). During the demodulation and/or decoding process, settlement receiver 622 may generate and provide link information 638 describing various aspects of forward link 230 (e.g., signal-to-noise ratio, rate of decoding errors, and so on) to a link state monitor 624, which may generate link state 636. In addition, a traffic monitor 626 may receive and/or regulate the flow of user return data 634 from one or more user devices 601 (e.g., data to be uploaded to Internet connection 110, data acknowledgments, and so forth) and provide that data to a settlement transmitter 628. In turn, settlement transmitter 628 may encode and/or modulate user return data, along with link state 636 to generate and provide return data/link state 640 to RF electronics 620 for transmission via return link 240 (e.g., via settlement link 116 and gateway link 114) to gateway ground station 104 according beam-hopping schedule 646.

Figure 7:
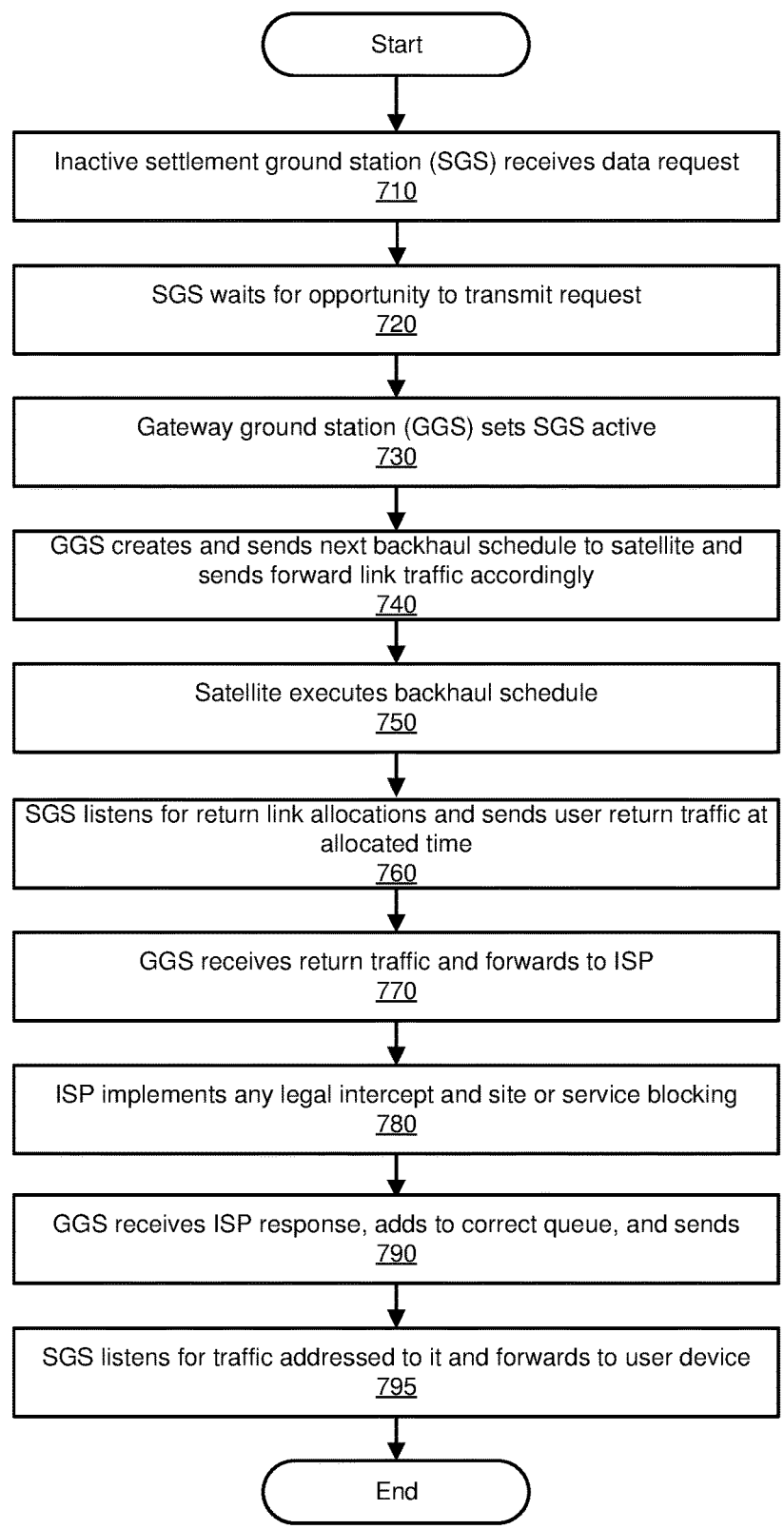
FIG. 7 is a flow diagram of an exemplary method of servicing a new data request, as employable in the communication system of FIG. 3.

FIG. 7 is a flow diagram of an exemplary method 700 for processing a new data request from a settlement ground station 106 (e.g., employing system 300). The steps shown in FIG. 7, as well as those illustrated in FIG. 8, may be performed by the one or more functional blocks and other infrastructure described in conjunction with FIG. 6 and elsewhere within. In one example, each of the steps shown in FIGS. 7 and 8 may represent an algorithm whose structure includes and/or is represented by multiple sub-steps, examples of which are described more fully above. Also, modifications departing from one or more steps shown in FIGS. 7 and 8 are possible in various embodiments.

In method 700, at step 710, an inactive settlement ground station 106 (e.g., one not currently accounted for in beam-hopping (backhaul) schedule 646) may receive a data request (e.g., from a user device 601). At step 720, in response to the request, settlement ground station 106 may wait for an opportunity to transmit the request via return link 240 (e.g., after the current super-frame 502 of forward link 230). At step 730, gateway ground station 104, after receiving the request, may set settlement ground station 106 active (e.g., to backhaul scheduler 614). In response, at step 740, gateway ground station 104 may create and send the next backhaul schedule 646 by way of array control 644 to LEO satellite 102 via gateway link 114, as well as any resulting forward link 230 traffic according to the plan. At step 750, in response to receiving array control 644 reflecting backhaul schedule 646, LEO satellite 102 may implement backhaul schedule 646. At step 760, settlement ground station 106 may listen for return link 240 allocations and send user return data 634 at slot 410 allocated to settlement ground station 106. In response, at step 770, gateway ground station 104 may receive provide user return data 634 to an Internet Service Provide (ISP) via Internet connection 110. At step 780, the ISP may implement any legal intercept actions, as well as site or service blocking (e.g., under an agreement between the ISP and the user of user device 601). At step 790, gateway ground station 104 may receive an associated response (e.g., forwarded data), add the data to the correct settlement queue 604, and provide that data via forward link 230 according to backhaul schedule 646. In response, at step 795, settlement ground station 106 may listen for and receive traffic addressed for that settlement ground station 106 via forward link 230, and then forward that traffic to requesting user device 601.

Figure 8:
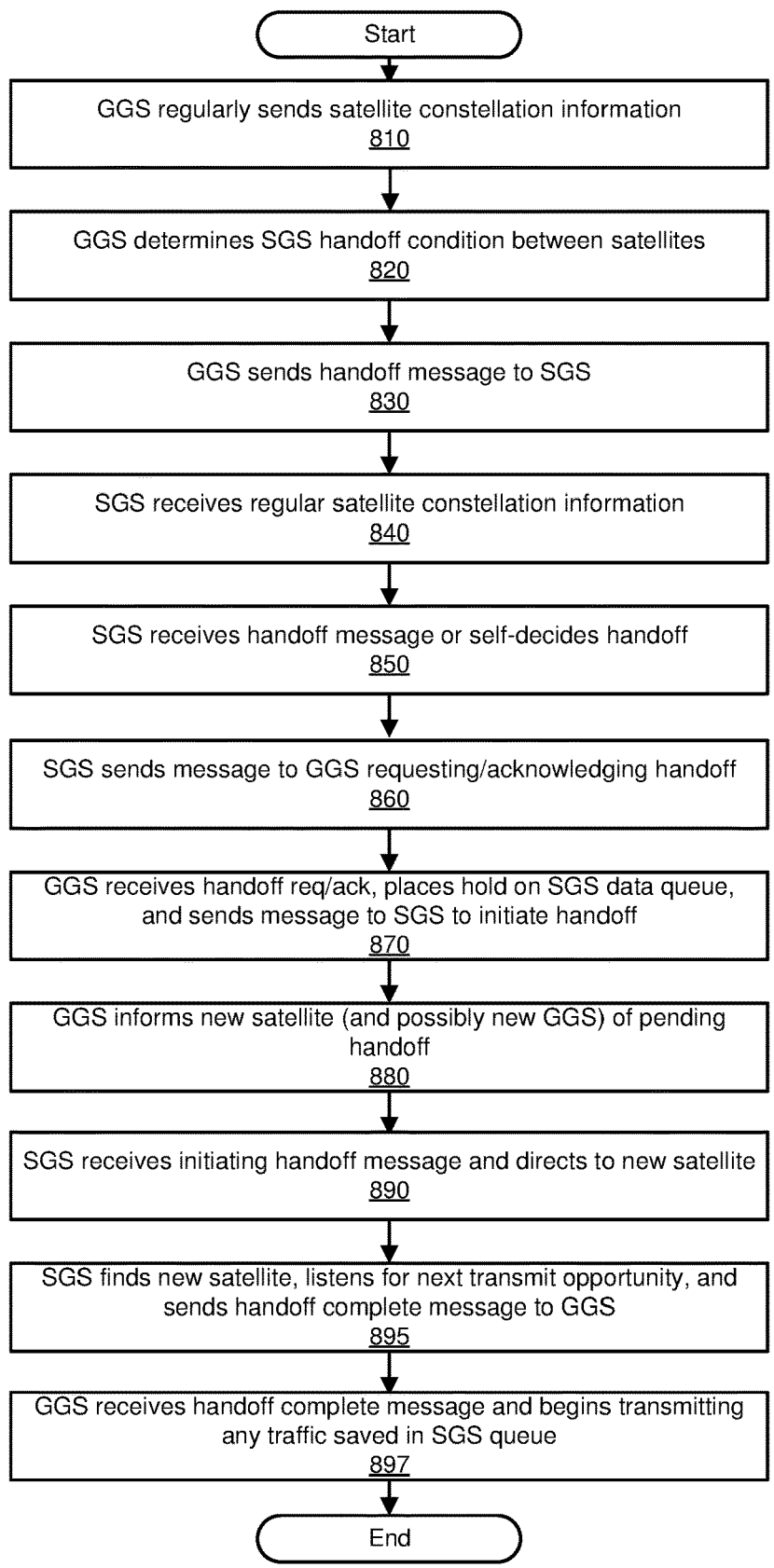
FIG. 8 is a flow diagram of an exemplary method of handing off a settlement gateway station between satellites, as employable in the communication system of FIG. 3.

FIG. 8 is a flow diagram of an exemplary method 800 of a handoff of a settlement ground station 106 (and possibly a corresponding gateway ground station 104) from one LEO satellite 102 to another within a group or "constellation" of LEO satellites 102 that orbit Earth, as described above. In method 800, at step 810, gateway ground station 104 may regularly (e.g., periodically) send satellite constellation information (e.g., via forward link 230) to settlement ground stations 106. At step 820, gateway ground station 106 may determine a handoff condition between LEO satellites 102 affecting a settlement ground station 106 (e.g., LEO satellite 102 currently servicing settlement ground station 106 may soon be out of range) based on the satellite constellation information. In response, at step 830, gateway ground station 104 may send a handoff message to settlement ground station 106 (e.g., via forward link 230). At step 840, settlement ground station 106 may receive the satellite constellation information regularly transmitted by gateway ground station 104. At step 850, settlement ground station 106 may determine that a handoff from one LEO satellite 102 to another is desired, based on receiving the handoff message from gateway ground station 104 or on the satellite constellation information last received. Consequently, at step 860, settlement ground station 106 may send a message requesting the handoff or an acknowledgment of the previous handoff request received from gateway ground station 104 (e.g., via return link 240). Thereafter, at step 870, gateway ground station 104, in response to the handoff request or acknowledgment from settlement ground station 106, may place a hold on settlement queue 604 corresponding to settlement ground station 106 and send a message to settlement ground station 106 (e.g., via forward link 230) to initiate the handoff. Also, at step 880, gateway ground station 104 may inform a new LEO satellite 102 (and possibly a new gateway ground station 104) of the pending handoff. At step 890, settlement ground station 106 may receive the handoff initiating message from gateway ground station 104 (e.g., via forward link 230) and, in response, direct its antenna to the new LEO satellite 102. Thereafter, at step 895, settlement ground station 106, upon finding new LEO satellite 102, may listen for its next transmission opportunity over return link 240, over which it may transmit a handoff completion message to gateway ground station 104. At step 897, in response to receiving the handoff completion message, gateway ground station 104 may begin transmitting any traffic previously held in settlement queue 604 corresponding to settlement ground station 106.

As explained above in conjunction with FIGS. 1-8, by employing multiple LEO satellites with high-performance beam-hopping or beam-steering communication capability to couple multiple separate settlements with a corresponding gateway ground station, the resulting communication system may provide Internet connectivity with substantial data throughput at a relatively modest cost compared to other systems. Further, deploying such capability within a standardized miniature flight platform may further enhance the cost-effectiveness of the system.

EXAMPLE EMBODIMENTS

Example 1: A communication satellite may include (1) a signal transmission subsystem that simultaneously generates a first transmission beam to a first ground station and a second transmission beam to each of a plurality of second ground stations in sequence according to a schedule, (2) a signal reception subsystem that simultaneously receives a third transmission beam from the first ground station and a fourth transmission beam from each of the plurality of second ground stations in sequence according to the schedule, and (3) communication circuitry that (a) forwards first data received via the third transmission beam from the first ground station to each of the plurality of second ground stations via the second transmission beam, and (b) forwards second data received via the fourth transmission beam from each of the plurality of second ground stations to the first ground station via the first transmission beam.

Example 2: The communication satellite of Example 1, where (1) the first ground station may include a gateway ground station providing an Internet connection, (2) the plurality of second ground stations may include a plurality of settlement ground stations, and (3) each of the plurality of settlement ground stations may facilitate a connection with one or more user communication devices.

Example 3: The communication satellite of either Example 1 or Example 2, where the schedule may be based at least in part on an amount of demand for bandwidth through the first ground station by each of the plurality of second ground stations.

Example 4: The communication of satellite of Example 1, where (1) the signal transmission subsystem may include a transmit reflector array antenna that provides a first aperture for the first transmission beam and the second transmission beam, and (2) the signal reception subsystem may include a receive reflector array antenna that provides a second aperture for the third transmission beam and the second transmission beam.

Example 5: The communication satellite of Example 4, where the transmit reflector array antenna and the receive reflector array antenna extend in opposing directions from opposing sides of the communication satellite.

Example 6: The communication satellite of Example 5, where (1) the communication satellite may be configured as a microsatellite including (a) a top end, (b) a bottom end opposite the top end, (c) opposing short sides coupling the top end to the bottom end, and (d) opposing long sides coupling the top end to the bottom end, and (2) the transmit reflector array antenna and the receive reflector array antenna may extend from the opposing short sides at the bottom end of the communication satellite.

Example 7: The communication satellite of Example 6, where the communication satellite may further include a first solar panel and a second solar panel that generate electrical power for the communication satellite, where the first solar panel and the second solar panel extend from the opposing long sides at the top end of the communication satellite.

Example 8: The communication satellite of Example 1, where at least one of the first transmission beam, the second transmission beam, the third transmission beam, or the fourth transmission beam may be circularly polarized.

Example 9: The communication satellite of Example 8, where (1) the first transmission beam and the second transmission beam may be circularly polarized in opposing directions, and (2) the third transmission beam and the fourth transmission beam may be circularly polarized in opposing directions.

Example 10: The communication satellite of either Example 1 or Example 2, where (1) the first transmission beam may operate within a first frequency range, (2) the second transmission beam may operate within a second frequency range, (3) the third transmission beam may operate within a third frequency range, (4) the fourth transmission beam may operate within a fourth frequency range, and (5) the first frequency range, the second frequency range, the third frequency range, and the fourth frequency range may be non-overlapping ranges relative to each other.

Example 11: The communication satellite of Example 1, where the communication satellite may travel in low Earth orbit such that the communication satellite services the first ground station and each of the plurality of second ground stations for first periodic segments of time.

Example 12: The communication satellite of Example 11, where the first ground station and each of the plurality of second ground stations may be serviced by at least one other communication satellite for second periodic segments of time different from the first periodic segments of time.

Example 13: The communication satellite of Example 12, where the first ground station may initiate a handoff procedure of the first ground station between the communication satellite and the at least one other communication satellite.

Example 14: The communication satellite of either Example 12 or Example 13, where, for each of the plurality of second ground stations, the first ground station or the second ground station may initiate a handoff procedure of the second ground station between the communication satellite and the at least one other communication satellite.

Example 15: The communication satellite of either Example 1 or Example 2, where the first ground station may generate the schedule and provide instructions via the third transmission beam to the communication satellite to control the signal transmission subsystem and the signal reception subsystem according to the schedule.

Example 16: The communication satellite of Example 1, where (1) the schedule may define a repeating time frame including a number of time slots, and (2) each of the plurality of second ground stations may be in communication with the communication satellite during a corresponding one of the number of time slots of the time frame.

Example 17: The communication satellite of Example 16, where a bandwidth demand of each of the plurality of second ground stations may determine at least in part a length of the corresponding one of the number of time slots of the time frame.

Example 18: The communication satellite of either Example 16 or Example 17, where each corresponding one of the number time slots may include a settle time to allow the second transmission beam to be redirected between a first of the plurality of second ground stations and a second of the plurality of second ground stations.

Example 19: A method may include (1) simultaneously generating, by a communication satellite, a first transmission beam to a first ground station and a second transmission beam to each of a plurality of second ground stations in sequence according to a schedule, (2) simultaneously receiving, by the communication satellite, a third transmission beam from the first ground station and a fourth transmission beam from each of the plurality of second ground stations in sequence according to the schedule, (3) forwarding, by the communication satellite, first data received via the third transmission beam from the first ground station to each of the plurality of second ground stations via the second transmission beam, and (4) forwarding, by the communication satellite, second data received via the fourth transmission beam from each of the plurality of second ground stations to the first ground station via the first transmission beam.

Example 20: A communication system may include (1) a gateway ground station including an Internet connection, (2) a plurality of settlement ground stations, where each of the settlement ground stations provides communication connectivity for one or more user communication devices, and (3) a communication satellite that provides communication connectivity between the communication satellite and the gateway ground station over a first bidirectional link and between the communication satellite and each of the plurality of settlement ground stations in sequence according to a schedule over a second bidirectional link.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

What is claimed is:

1. A communication satellite comprising:
a signal transmission subsystem that simultaneously generates a first transmission beam to a first ground station and a second transmission beam to each of a plurality of second ground stations in sequence according to a schedule;
a signal reception subsystem that simultaneously receives a third transmission beam from the first ground station and a fourth transmission beam from each of the plurality of second ground stations in sequence according to the schedule; and
communication circuitry that:
forwards first data received via the third transmission beam from the first ground station to each of the plurality of second ground stations via the second transmission beam; and
forwards second data received via the fourth transmission beam from each of the plurality of second ground stations to the first ground station via the first transmission beam.

2. The communication satellite of claim 1, wherein:
the first ground station comprises a gateway ground station providing an Internet connection;
the plurality of second ground stations comprise a plurality of settlement ground stations; and
each of the plurality of settlement ground stations facilitates a connection with one or more user communication devices.

3. The communication satellite of claim 1, wherein the schedule is based at least in part on an amount of demand for bandwidth through the first ground station by each of the plurality of second ground stations.

4. The communication satellite of claim 1, wherein:
the signal transmission subsystem comprises a transmit reflector array antenna that provides a first aperture for the first transmission beam and the second transmission beam; and
the signal reception subsystem comprises a receive reflector array antenna that provides a second aperture for the third transmission beam and the second transmission beam.

5. The communication satellite of claim 4, wherein the transmit reflector array antenna and the receive reflector array antenna extend in opposing directions from opposing sides of the communication satellite.

6. The communication satellite of claim 5, wherein:
the communication satellite is configured as a microsatellite comprising:
a top end;
a bottom end opposite the top end;
opposing short sides coupling the top end to the bottom end; and
opposing long sides coupling the top end to the bottom end; and
the transmit reflector array antenna and the receive reflector array antenna extend from the opposing short sides at the bottom end of the communication satellite.

7. The communication satellite of claim 6, further comprising:
a first solar panel and a second solar panel that generate electrical power for the communication satellite, wherein the first solar panel and the second solar panel extend from the opposing long sides at the top end of the communication satellite.

8. The communication satellite of claim 1, wherein at least one of the first transmission beam, the second transmission beam, the third transmission beam, or the fourth transmission beam is circularly polarized.

9. The communication satellite of claim 8, wherein:
the first transmission beam and the second transmission beam are circularly polarized in opposing directions; and
the third transmission beam and the fourth transmission beam are circularly polarized in opposing directions.

10. The communication satellite of claim 1, wherein:
the first transmission beam operates within a first frequency range;
the second transmission beam operates within a second frequency range;
the third transmission beam operates within a third frequency range;
the fourth transmission beam operates within a fourth frequency range; and
the first frequency range, the second frequency range, the third frequency range, and the fourth frequency range comprise non-overlapping ranges relative to each other.

11. The communication satellite of claim 1, wherein the communication satellite travels in low Earth orbit such that the communication satellite services the first ground station and each of the plurality of second ground stations for first periodic segments of time.

12. The communication satellite of claim 11, wherein the first ground station and each of the plurality of second ground stations are serviced by at least one other communication satellite for second periodic segments of time different from the first periodic segments of time.

13. The communication satellite of claim 12, wherein the first ground station initiates a handoff procedure of the first ground station between the communication satellite and the at least one other communication satellite.

14. The communication satellite of claim 12, wherein, for each of the plurality of second ground stations, the first ground station or the second ground station initiates a handoff procedure of the second ground station between the communication satellite and the at least one other communication satellite.

15. The communication satellite of claim 1, wherein the first ground station generates the schedule and provides instructions via the third transmission beam to the communication satellite to control the signal transmission subsystem and the signal reception subsystem according to the schedule.

16. The communication satellite of claim 1, wherein:
the schedule defines a repeating time frame comprising a number of time slots; and each of the plurality of second ground stations is in communication with the communication satellite during a corresponding one of the number of time slots of the time frame.

17. The communication satellite of claim 16, wherein a bandwidth demand of each of the plurality of second ground stations determines at least in part a length of the corresponding one of the number of time slots of the time frame.

18. The communication satellite of claim 16, wherein each corresponding one of the number time slots includes a settle time to allow the second transmission beam to be redirected between a first of the plurality of second ground stations and a second of the plurality of second ground stations.

19. A method comprising:
   simultaneously generating, by a communication satellite, a first transmission beam to a first ground station and a second transmission beam to each of a plurality of second ground stations in sequence according to a schedule;
   simultaneously receiving, by the communication satellite, a third transmission beam from the first ground station and a fourth transmission beam from each of the plurality of second ground stations in sequence according to the schedule;
   forwarding, by the communication satellite, first data received via the third transmission beam from the first ground station to each of the plurality of second ground stations via the second transmission beam; and
   forwarding, by the communication satellite, second data received via the fourth transmission beam from each of the plurality of second ground stations to the first ground station via the first transmission beam.

20. A communication system comprising:
   a gateway ground station comprising an Internet connection;
   a plurality of settlement ground stations, wherein each of the settlement ground stations provides communication connectivity for one or more user communication devices; and
   a communication satellite that:
      simultaneously generates a first transmission beam to a first ground station and a second transmission beam to each of a plurality of second ground stations in sequence according to a schedule;
      simultaneously receives a third transmission beam from the first ground station and a fourth transmission beam from each of the plurality of second ground stations in sequence according to the schedule;
      forwards first data received via the third transmission beam from the first ground station to each of the plurality of second ground stations via the second transmission beam; and
      forwards second data received via the fourth transmission beam from each of the plurality of second ground stations to the first ground station via the first transmission beam.

* * * * *